| United States Patent [19] | [11] Patent Number: 4,578,036 |
|---|---|
| Leighton | [45] Date of Patent: Mar. 25, 1986 |

[54] METHOD OF INSTRUCTIONS FOR KNITTING AND CROCHETING

[76] Inventor: Estelle Leighton, 205 Graham St., Stratford, Conn. 06947

[21] Appl. No.: 485,198

[22] Filed: Apr. 15, 1983

[51] Int. Cl.[4] ............................................... G09B 19/20
[52] U.S. Cl. ....................................... 434/95; 66/1 A; 112/266.1; 112/439; 283/1 A
[58] Field of Search ............... 434/95; 112/439, 266.1; 66/1 A; 283/1 A

[56] References Cited

U.S. PATENT DOCUMENTS

| 457,166 | 8/1891 | Olsson | 66/1 A X |
|---|---|---|---|
| 748,939 | 1/1904 | Faust | 283/1 A |
| 1,538,718 | 5/1925 | Mehlem | 283/1 A |
| 2,142,767 | 1/1939 | Stemm | 66/1 A |
| 2,301,410 | 11/1942 | Kaplan et al. | 434/95 |
| 2,435,068 | 1/1948 | Bellamy | 66/1 A X |
| 4,310,313 | 1/1982 | Brundige | 434/95 |

*Primary Examiner*—William H. Grieb
*Attorney, Agent, or Firm*—Pasquale A. Razzano

[57] ABSTRACT

A method for instructions for knitting and crocheting in which the location, type, and number of each stitch is exactly indicated on a pattern piece scaled to the final shape of the finished item.

11 Claims, 13 Drawing Figures

THREE WAYS HAT I

Key —
S — Single Crochet
Ⓢ⒮ — Two stitches, same stitch (increase)
C — Chain
Colors can be indicated as desired
→ Direction - (start of round)

Gauge: F Needle
4 stitches / inch

| ROUNDS | STITCHES | TOTAL STITCHES |
|---|---|---|
| 0 | CCCC (join with slip stitch) | 4 |
| 1 | ⒮⒮⒮⒮ | 8 |
| 2 | ⒮⒮⒮⒮⒮⒮⒮⒮ | 16 |
| 3 | ⒮S⒮S⒮S⒮S⒮S⒮S⒮S⒮S | 24 |
| 4 | ⒮SS⒮SS⒮SS⒮SS⒮SS⒮SS⒮SS⒮SS | 36 |
| 5 | SSSSSSSSSSSSSSSSSSSSSSSSSSSSSSSSSSSS | 36 |
| 6 | ⒮SS⒮SSS⒮SSS⒮SSSS⒮SSSS⒮SSSS⒮SSSS⒮SSSS | 48 |
| 7 | SSSSSSSSSSSSSSSSSSSSSSSSSSSSSSSSSSSSSSSSSSSSSSSS | 48 |
| 8 | SSSSSSSSSSSSSSSSSSSSSSSSSSSSSSSSSSSSSSSSSSSSSSSS | 48 |
| 9 | SSSSSSSSSSSSSSSSSSSSSSSSSSSSSSSSSSSSSSSSSSSSSSSS | 48 |
| 10 | SSSSSSSSSSSSSSSSSSSSSSSSSSSSSSSSSSSSSSSSSSSSSSSS | 48 |
| 11 | SSSSSSSSSSSSSSSSSSSSSSSSSSSSSSSSSSSSSSSSSSSSSSSS | 48 |
| 12 | SSSSSSSSSSSSSSSSSSSSSSSSSSSSSSSSSSSSSSSSSSSSSSSS | 48 |
| 13 | SSSSSSSSSSSSSSSSSSSSSSSSSSSSSSSSSSSSSSSSSSSSSSSS | 48 END. |

Button Top:
CCCC (join with slip stitch)
SSSSSSS
SSSSSSS END. SEW TO TOP OF HAT

FIG. 2

THREE WAYS HAT II

| ROUNDS | STITCHES | TOTAL STITCHES |
|---|---|---|
| 0 | CCCC    (join with slip stitch) | 4 |
| 1 | SSSSSSSS | 8 |
| 2 | S(S)S(S)S(S)S(S)S(S)S(S)S(S)S(S) | 16 |
| 3 | SSS(S)SSS(S)SSS(S)SSS(S)SSS(S)SSS(S) | 24 |
| 4 | SS(S)SSS(S)SSS(S)SSS(S)SSS(S)SSS(S)SSS(S)SSS(S)SSS(S)SSS(S)SSS(S)SS | 36 |
| 5 | S(S)S(S)S(S)S(S)S(S)S(S)S(S)S(S)S(S)S(S)S(S)S(S)S(S)S(S)S(S)S(S)S(S)S(S) | 48 |
| 6 | SSSSSSSSSSSSSSSSSSSSSSSSSSSSSSSSSSSSSSSSSSSSSSSS | 48 |
| 7 | SSSSSSSSSSSSSSSSSSSSSSSSSSSSSSSSSSSSSSSSSSSSSSSS | 48 |
| 8 | SSSSSSSSSSSSSSSSSSSSSSSSSSSSSSSSSSSSSSSSSSSSSSSS | 48 |
| 9 | SSSSSSSSSSSSSSSSSSSSSSSSSSSSSSSSSSSSSSSSSSSSSSSS | 48 |
| 10 | SSSSSSSSSSSSSSSSSSSSSSSSSSSSSSSSSSSSSSSSSSSSSSSS | 48 |
| 11 | SSSSSSSSSSSSSSSSSSSSSSSSSSSSSSSSSSSSSSSSSSSSSSSS | 48 |
| 12 | SSSSSSSSSSSSSSSSSSSSSSSSSSSSSSSSSSSSSSSSSSSSSSSS | 48 |
| 13 | SSSSSSSSSSSSSSSSSSSSSSSSSSSSSSSSSSSSSSSSSSSSSSSS | 48 |
| 14 | (72 characters showing increase of every other stitch) | 72 |
| 15 | (72 characters) | 72 |
| 16 | (72 characters) | 72 TURN |
| 17 | (72 characters) | 72 END. |

FIG. 3

THREE WAYS HAT III

| ROUNDS | STITCHES | TOTAL STITCHES |
|---|---|---|
| 0 | CCCC (join with slip stitch) | 4 |
| 1 | SSSS | 8 |
| 2 | S(S)S(S)S(S)S(S) | 16 |
| 3 | S(S)SS(S)SS(S)SS(S)SS(S)SS(S)SS | 24 |
| 4 | SS(S)SSS(S)SSS(S)SSS(S)SSS(S)SSS(S)SSS | 36 |
| 5 | SSSSSSSSSSSSSSSSSSSSSSSSSSSSSSSSSSSS | 36 |
| 6 | SSS(S)SSSSS(S)SSSSS(S)SSSSS(S)SSSSS(S)SSSSS(S)SSSSS | 48 |
| 7 | SSSSSSSSSSSSSSSSSSSSSSSSSSSSSSSSSSSSSSSSSSSSSSSS | 48 |
| 8 | SSSSSSSSSSSSSSSSSSSSSSSSSSSSSSSSSSSSSSSSSSSSSSSS | 48 |
| 9 | SSSSSSSSSSSSSSSSSSSSSSSSSSSSSSSSSSSSSSSSSSSSSSSS | 48 |
| 10 | SSSSSSSSSSSSSSSSSSSSSSSSSSSSSSSSSSSSSSSSSSSSSSSS | 48 |
| 11 | SSSSSSSSSSSSSSSSSSSSSSSSSSSSSSSSSSSSSSSSSSSSSSSS | 48 |
| 12 | SSSSSSSSSSSSSSSSSSSSSSSSSSSSSSSSSSSSSSSSSSSSSSSS | 48 |
| 13 | SSSSSSSSSSSSSSSSSSSSSSSSSSSSSSSSSSSS | 13 |
| 14 | SSSSSSSSSSSSSSSSSSSSSSSSSSSSSSSSSSSS | 36 C TURN |
| 15 | SSSSSSSSSSSSSSSSSSSSSSSSSSSSSSSSSSSS | 36 C TURN |
| 16 | SSSSSSSSSSSSSSSSSSSSSSSSSSSSSSSSSSSS | 36 C TURN |
| 17, 18, 19, 20 | | |
| 21 | CCCCCCCCCCCCCCCC | 16 JOIN |
| 22 | SSSSSSSSSSSSSSSSSSSSSSSSSSSSSSSSSSSSSSSSSSSSSSSSSSSS | 52 |
| 23 | SSSSSSSSSSSSSSSSSSSSSSSSSSSSSSSSSSSSSSSSSSSSSSSSSSSS | 52 TURN |
| 24 | SSSSSSSSSSSSSSSSSSSSSSSSSSSSSSSSSSSSSSSSSSSSSSSSSSSS | 52 END. |

FIG. 4

PINK COAT (BACK)

KEY
- B — Bind off
- K — Knit
- P — Purl
- KK — Increase one stitch (knit)
- p̄ — Decrease one stitch (purl)
- ⌒ — Gather together indicated stitches Use # 8 needle throughout pattern except where * change to # 4 needle

| ROWS | STITCHES (hold on pin for collar) | TOTAL STITCHES |
|---|---|---|
| 64 | BBBBBBPPPPPP | 6 |
| 63 | KKKKKKKKKKKKBBBBBB | 12 |
| 62 | PPPPPPPPPPPPPPPPPP | 18 |
| 61 | KKKKKKKKKKKKKKKKKK | 18 |
| 60 | PPPPPPPPPPPPPPPPPP | 18 |
| 59 | KKKKKKKKKKKKKKKKKK | 18 |
| 58 | PPPPPPPPPPPPPPPPPP | 18 |
| 57 | k̄KKKKKKKKKKKKKKKKk̄ | 18 |
| 56 | PPPPPPPPPPPPPPPPPPPP | 20 |
| 55 | k̄KKKKKKKKKKKKKKKKKKk̄ | 20 |
| 54 | PPPPPPPPPPPPPPPPPPPPPP | 22 |
| 53 | k̄KKKKKKKKKKKKKKKKKKKKk̄ | 22 |
| 52 | PPPPPPPPPPPPPPPPPPPPPPPP | 24 |
| 51 | k̄KKKKKKKKKKKKKKKKKKKKKKk̄ | 24 |
| 50 | BBPPPPPPPPPPPPPPPPPPPPPPPP | 26 |
| 49 | KKKKKKKKKKKKKKKKKKKKKKKKKKBB | 28 |
| 43-48 | ——— repeat lines 41-42 ——— | 30 |
| 42 | PPPPPPPPPPPPPPPPPPPPPPPPPPPPPP | 30 |
| 41 | KKKKKKKKKKKKKKKKKKKKKKKKKKKKKK | 30 |
| 40 | PPPPPPPPPPPPPPPPPPPPPPPPPPPPPP | 30 |
| 39 | KKKKKKKKKKKKKKKKKKKKKKKKKKKKKK | 30 |
| 38 * #4 | PPPPPPPPPPPPPPP | 15 |
| 37 * #4 | KKKKKKKKKKKKKKK | 15 |
| 36 | PPPPPPPPPPPPPPP | 15 |
| 35 | K͡K K͡K K͡K K͡K K͡K K͡K K͡K K͡K | 15 |
| 34 | P͡PP P͡PP P͡PP P͡PP P͡PP P͡PP P͡PP P͡PP P͡PP P͡PP | 30 |
| 33 | KKKKKKKKKKKKKKKKKKKKKKKKKKKKKK | 30 |
| 9-32 | ——— repeat rows 7 and 8 ——— | 30 |
| 8 | PPPPPPPPPPPPPPPPPPPPPPPPPPPPPP | 30 |
| 7 | KKKKKKKKKKKKKKKKKKKKKKKKKKKKKK | 30 |
| 6 | PPPPPPPPPPPPPPPPPPPPPPPPPPPPPP | 30 |
| 2-5 | repeat row #1 | 30 |
| 1 | KKKKKKKKKKKKKKKKKKKKKKKKKKKKKK | 30 |
| 0 | CCCCCCCCCCCCCCCCCCCCCCCCCCCCCC | 30 |

FIG. 6

SLEEVE-(20)

| ROWS | STITCHES | TOTAL STITCHES |
|---|---|---|
| 41 | B B B | — |
| 40 | B B P P P | 3 |
| 39 | K K K K K B B | 5 |
| 38 | P P P P P P P P | 8 |
| 37 | K K K K K K K K | 8 |
| 36 | P P P P P P P P | 8 |
| 35 | K K K K K K K K | 8 |
| 34 | P P P P P P P P | 8 |
| 33 | K̄ K K K K K K K K̄ | 8 |
| 32 | P P P P P P P P P P | 10 |
| 31 | K̄ K K K K K K K K K K̄ | 10 |
| 30 | P P P P P P P P P P P P | 12 |
| 29 | K̄ K K K K K K K K K K K K̄ | 12 |
| 28 | B B P P P P P P P P P P P P | 14 |
| 27 | K K K K K K K K K K K K K K B B | 16 |
| 19-26 | ——— repeat lines 17 & 18 ——— | 18 |
| 18 | P P P P P P P P P P P P P P P P P P | 18 |
| 17 | K K K K K K K K K K K K K K K K K K | 18 |
| 16 | P P P P P P P P P P P P P P P P P P | 18 |
| 15 | K kk K K K K K K K K K K K K kk K | 18 |
| 14 | P P P P P P P P P P P P P P P P | 16 |
| 13 | K K K K K K K K K K K K K K K K | 16 |
| 12 | P P P P P P P P P P P P P P P P | 16 |
| 11 | K kk K K K K K K K K K K K kk K | 16 |
| 10 | P P P P P P P P P P P P P P | 14 |
| 9 | K K K K K K K K K K K K K K | 14 |
| 8 | P P P P P P P P P P P P P P | 14 |
| 7 | K kk K K K K K K K K K kk K | 14 |
| 6 | P P P P P P P P P P P P | 12 |
| 2-5 | ——— repeat line #1 ——— | 12 |
| 1 | K K K K K K K K K K K K | 12 |
| — | C C C C C C C C C C C C | 12 |

FIG. 7

COAT COLLAR-(22)

% — Pick up stitches from right front
& — Pick up stitches from left front
H — Pick up stitches held from coat back
K — Knit
B — Bind

| ROWS | STITCHES | TOTAL STITCHES |
|---|---|---|
| 2-5 | BBBBBBBBBBBBBBBBBB <br> repeat line #1 | 18 |
| 1 | KKKKKKKKKKKKK &&& %% HHHHH %% && | 18 |

With Right side facing you, pick up 6 stitches from Right Front – 6 stitches from left 6 stitches from left side.

FIG. 8

LEFT FRONT

KEY

B — Bind off
K — Knit
P — Purl
⌒ — Gather together indicated stitches
KK — Increase one stitch (knit)
p̄ — Decrease one stitch (purl)
k̄ —   "    "    "   (knit)

Use # 8 needle throughout pattern
except where * change to # 4 needle

| ROWS | STITCHES | TOTAL STITCHES |
|---|---|---|
| 65 | B B B B B B | — |
| 64 | P P P P P P | 6 |
| 63 | K K K K K K | 6 |
| 62 | B B B B P P P P P P | 6 |
| 61 | K K K K K K K K K | 10 |
| 60 | K K P P P P P P P p̄ | 10 |
| 59 | K K K K K K K K K k̄ | 11 |
| 58 | K K P P P P P P P P P | 12 |
| 57 | K K K K K K K K K K k̄ | 12 |
| 56 | K K P P P P P P P P P P | 13 |
| 55 | K K K K K K K K K K K k̄ | 13 |
| 54 | K K P P P P P P P P P P P | 14 |
| 53 | K K K K K K K K K K K K k̄ | 14 |
| 52 | K K P P P P P P P P P P P P | 15 |
| 51 | K K K K K K K K K K K K K B B | 15 |
| 50 | K K P P P P P P P P P P P P P | 17 |
| 44 to 49 | —— repeat lines 42 & 43 —— | |
| 43 | K K K K K K K K K K K K K K K K K | 17 |
| 42 | K K P P P P P P P P P P P P P P P | 17 |
| 41 | K K kk kk kk kk kk kk K | 17 |
| 40 | K K P P P P P P P P | 10 |
| 39 | K K K K K K K K K K | 10 |
| 38 | K K P P P P P P P P | 10 |
| 37 | K K ⌒k K⌒ ⌒k K⌒ ⌒k K⌒ ⌒k K⌒ K | 10 |
| 36 | K K ⌒P P P⌒ ⌒P P P⌒ ⌒P P P⌒ ⌒P P P⌒ | 17 |
| 35 | K K K K K K K K K K K K K K K K K | 17 |
| 7-34 | —— repeat lines 5 & 6 —— | 17 |
| 6 | K K P P P P P P P P P P P P P P P | 17 |
| 5 | K K K K K K K K K K K K K K K K K | 11 |
| 4 | K K K K K K K K K K K K K K K K K | 11 |
| 3 | K K K K K K K K K K K K K K K K K | 17 |
| 2 | K K K K K K K K K K K K K K K K K | 17 |
| 1 | K K K K K K K K K K K K K K K K K | 17 |
| 0 | C C C C C C C C C C C C C C C C C | 17 |

FIG. 9

PINK COAT (RIGHT FRONT)

KEY
B — Bind off
K — Knit
P — Purl
⁓ — Gather together indicated stitches
кк — Increase one stitch (knit)
p̄ — Decrease stitch (purl)

Use # 8 needle throughout pattern
except where * change to # 4 needle

| ROWS | STITCHES | TOTAL STITCHES |
|---|---|---|
| 65 | BBBBB | — |
| 64 | BBBBPPPPP | 5 |
| 63 | KKKKKKK̄KK | 9 |
| 62 | PPPPPPPPKK | 10 |
| 61 | KKKKKKKKKK | 10 |
| 60 | PPPPPPPPKK | 10 |
| 59 | KKK̄KKKKKK̄KK | 10 |
| 58 | PPPPPPPPPKKK | 12 |
| 57 | KKKKKKKKKKKK | 12 |
| 56 | p̄ p̄ PPPPPPPPKKKK | 12 |
| 55 | KKKKKKKKKккKK | 14 |
| 54 | p̄ p̄ PPPPPPPPPPKK | 12 |
| 53 | KKKKKKKKKKKKKK | 14 |
| 52 | BBKKKKKKKKKKKKKK | 14 |
| 51 | KKKKKKKKKKKккKK | 16 |
| 50 | PPPPPPPPPPPPKKK | 15 |
| 49 | KKKKKKKKKKKKKKK | 15 |
| 48 | PPPPPPPPPPPPKKK | 15 |
| 47 | KккKKKKKKKKKккKK | 15 |
| 46 | PPPPPPPPPPPKK | 13 |
| 45 | KKKKKKKKKKKKK | 13 |
| 44 | PPPPPPPPPPPKK | 13 |
| 43 | KKKKKKKKKккKK | 13 |
| 42 | PPPPPPPPPPKK | 12 |
| 41 | KккKKKKKKккKK | 12 |
| 40 * | PPPPPPPPKK | 10 |
| 39 * | KKKKKKKKKK | 10 |
| 38 * | PPPPPPPPKK | 10 |
| 37 * | K к K к K к K к K к KK | 10 |
| 36 | PPPPPPPPPPPPPPPKK | 17 |
| 35 | KKKKKKKKKKKKKKKKK | 17 |
| 7-34 | —repeat line 5 & 6 | |
| 6 | PPPPPPPPPPPPPPPKK | 17 |
| 5 | KKKKKKKKKKKKKKKKK | 17 |
| 2-4 | repeat line # 1 | 17 |
| 1 | KKKKKKKKKKKKKKKKK | 17 |
| | CCCCCCCCCCCCCCCCC | 17 |

FIG. 10

METHOD OF INSTRUCTIONS FOR KNITTING AND CROCHETING

BACKGROUND OF THE INVENTION

1. Field of the Invention

The present invention relates generally to instructions for knitting and crocheting and, more particularly, to a method of depicting instructions for knitting and/or crocheting a variety of items including for example, but not limited to garments, purses, toys, wall hangings, etc.

2. Discussion of the Prior Art

Typically, directions for knitting or crocheting are given in narrative form in books, magazines or in connection with patterns using standard abbreviations as well as standard indications of the various stitches and their juxtaposition.

For example, knitting instructions in narrative form for a sweater might consist of the following:

Cast on 58(62,66,70) sts. Row 1 (right side): *K 1, p 1; rep from * to end. Row 2: *P 1, k 1; rep from * to end. Rep last 2 rows (seed st) once more. Continue in St st (k 1 row, p 1 row), dec 1 st each side on next row and rep dec every 2nd row 3 times more—50(54,58,62) sts. Work 4 rows even. Inc 1 st each side on next row and rep inc every 4th row four times more—60(64,68,72) sts. Work even until piece measures 10½" from beg, or desired length to underarm. Armhole Shaping: Bind off 4 sts at beg of next 2 rows. Dec 1 st at beg of next 6 rows. Work even on 46(50,54,58) sts until armholes measure 7½(8,8½,9)". Shoulder Shaping: Bind off 5 sts at beg of next 0(0,2,4) rows, 4 sts at beg of next 2(4,2,0) rows, 3 sts at beg of next 2(0,0,0) rows—32(34,36,38) sts. Neck Border—Next Row: *K 1, p 1; rep from * to end. Row 2: Work seed st. dec 1 st each side—30(32,34,36) sts. Row 3: Work even in seed st. Row 4: Rep Row 2—28 (30,32,34) sts. Bind off all sts in seed st.

Similarly, crochet directions would typically be indicated as:

Beg at top, with smaller hook, ch 4. Join with sl st to first ch to form ring. Rnd 1: Work 2 sc in each ch around (8 sc). Rnds 2 & 3: Working thru back lp, work sc in each sc (32 sc). Rnd 4: *Sc in next sc, 2 sc in next sc; rep from * around (48 sc). Rnds 5,7,9,11 and 13: Sc in each sc. Rnd 6: *Sc in each of next 3 sc, 2 sc in next sc; rep from * around (60 sc). Rnd 8: Rep Rnd 6 (75 sc). Rnd 10: *Sc in next 3 sc, 2 sc in next sc; rep from *, end sc in last 3 sc (93 sc). Rnd 12: *Sc in next 4 sc, 2 sc in next sc; rep from *, end sc in last 3 sc (111 sc). Rnd 14: *Sc in next 6 sc, 2 sc in next sc; rep from * ,end sc in 1st 6 sc (126 sc). Rnds 15 thru 33: Sc in each sc. Fasten off.

Such instructions, describe row by row how the yarn is to be worked but obviously are unintelligible to the average person and particularly to a person new to needlecraft. While some such instructions may include an illustration or picture showing the final appearance of the piece being worked, such illustrations do not aid in understanding the narrative instructions or the steps to be followed in forming, knitting or crocheting the piece to be formed.

As is well known in manual knitting and/or crocheting items, the usual method, as described in the two previous examples, involves counting the stitches as well as the rows of stitches and narrowing or widening the piece as it is being worked as per the directions. Further, the character of the stitches is varied so as to produce, for example, plain knitting, purl knitting, ribbed knitting, and so forth.

One disadvantage associated with directions given in narrative form is that such instructions require an almost blind faith slavish adherence to each and every detail of the directions since it is virtually impossible to visualize whether or where modifications would prove propitious.

From the foregoing examples it is apparent that it is difficult if not impossible to imagine the final outcome of executing those directions. This is primarily a visualization problem which is due to the great difficulty, if not impossibility, in mentally converting the narrative form of notation into a three-dimensional structure.

As typically given, most for instructions for knitting and crocheting can be modified only with complicated calculations and with the use of various correction factors which must be accurately and precisely determined in advance. For example, when knitting/crocheting, it is imperative to keep stitches loose enough so that they can readily be slid along the needles, but firm enough so that they do not slide when undesired. Necessarily, variances will result as a function of the tension applied to the yarn during the knitting/crocheting operation. Not only do these variances in tensions arise among each of the individual stitches, but they also occur among the rows as well and can result in the item being significantly larger or smaller than anticipated or desired. Consequently, it must be determined in advance what (using a particular needle gauge, with a particular weight yarn) results in a given number of stitches per inch. This is known as the "gauge". Accordingly, a given set of directions may specify a gauge of, for example, four stitches/inch. If the knitter/crocheter determines in advance that his/her gauge is three stitches/inch, that individual must either knit/crochet more tightly, switch to a smaller needle size, or convert the instructions so as to accommodate this variance in gauge.

For a very simple pattern, it is fairly simple to convert the instructions and thereby compensate for the difference in gauge by merely adding or deleting a few stitches at either end of each row as the piece is being worked. However, for more complicated patterns, such as those based on and requiring an absolute multiple of stitches (i.e. either an even, odd, or even plus some prime number, etc.), such modifications can be quite complicated and not readily accommodated for by patterns having repeating motifs.

Another disadvantage associated with such typical instructions is that since they are in narrative form, it is impossible for the novice to anticipate the effect created by any particular juxtaposition of stitch types. As is apparent from the examples of typical instructions given above, to many it would not be apparent that "Even rows: * K 1, P 2 *; Odd rows: P 1, K 2 *" yields an entirely different and distinguishable result from "Even rows: * K 1, P 2 *; Odd rows P 1, * P 1, K 2 *, P 1". The former direction would result in what is commonly termed "ribbing"; whereas the latter, would yield a pattern which appears very intricate and irregular. Since such a result cannot be readily predicted, it is difficult, if not impossible, to ascertain whether any specified operations indicated for a given pattern have been faithfully and correctly executed.

As a consequence of the recently renewed interest in needle craft work in America today, it is highly desirable to develop a method of needle craft instructions that can be readily comprehended, followed, executed, and subsequently modified if desired.

OBJECTS AND SUMMARY OF THE INVENTION

It is an object of the present invention to provide a method of instructions for knitting and crocheting which effectively overcomes the aforementioned problems associated with the prior art. Particularly, the present invention provides directions having several distinct advantages. First, individuals who have not learned to read words, but who can read symbols, can follow such instructions. Second, elaborate, complicated color and/or stitch patterns can more readily be executed by both novices and experts alike.

A further advantage of this method is that the pattern clearly and precisely indicates alterations to accommodate any individual size variations desired for the completed item. While most typical directions give changes for smaller and larger sizes in parentheses, these changes result in an overall size change and do not provide for any localized increases or decreases in sizing which may be required.

Another object of the present invention is to provide an improved method that can not only be more readily followed and executed but that can be readily comprehended in its entirety.

In accordance with an aspect of the present invention, a method has been provided by which a needlecraft project can be readily understood by the presentation of not only a pictorial representation of the completed item but also a graphic representation of the location and type of each and every one of the individual stitches in the item. This method is especially useful for complicated patterns utilizing a great variety of stitch types, with numerous colors and kinds of yarns, and having other items worked into the piece at various points, such as pearls, feathers, ribbons, sequins, and other embellishments.

BRIEF DESCRIPTION OF THE DRAWINGS

The foregoing, and other objects, features and advantages of the invention, will become more readily apparent from the following detailed description of an illustrative embodiment thereof, taken in conjunction with the accompanying drawings wherein:

FIG. 1b is another embodiment of the hat of FIG. 1a;

FIG. 1c is a further embodiment of the hat in FIG. 1a;

FIG. 5b is a rear view of the coat of FIG. 5a;

Figure 1A:
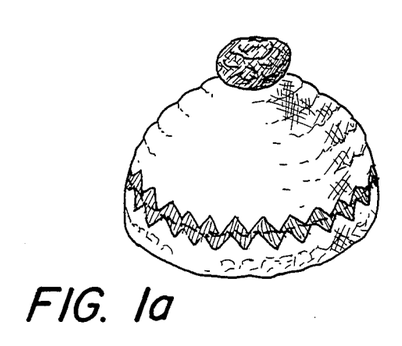
FIG. 1a is a perspective view of a small hat adapted to be crocheted following the instructions of the present invention.
Figure 1B:
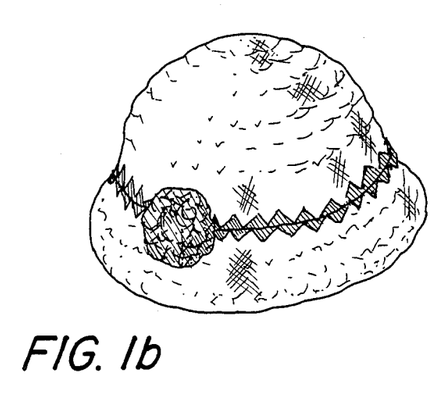
Figure 1C:
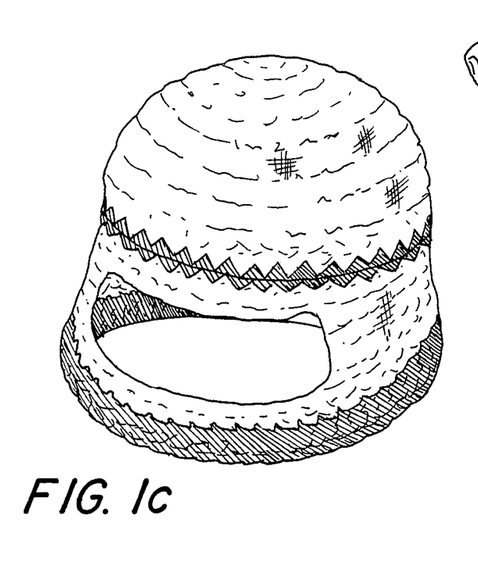
Figure 3:
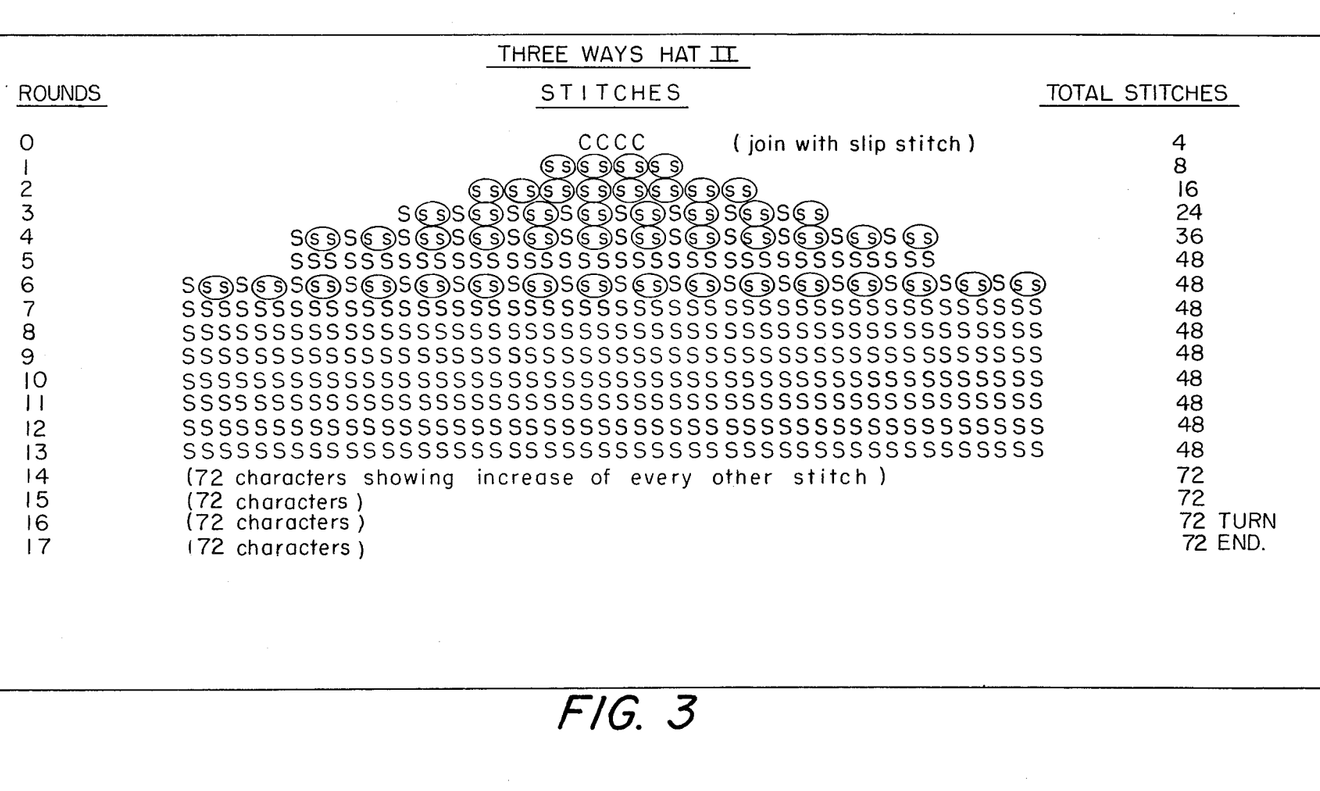
Figure 4:
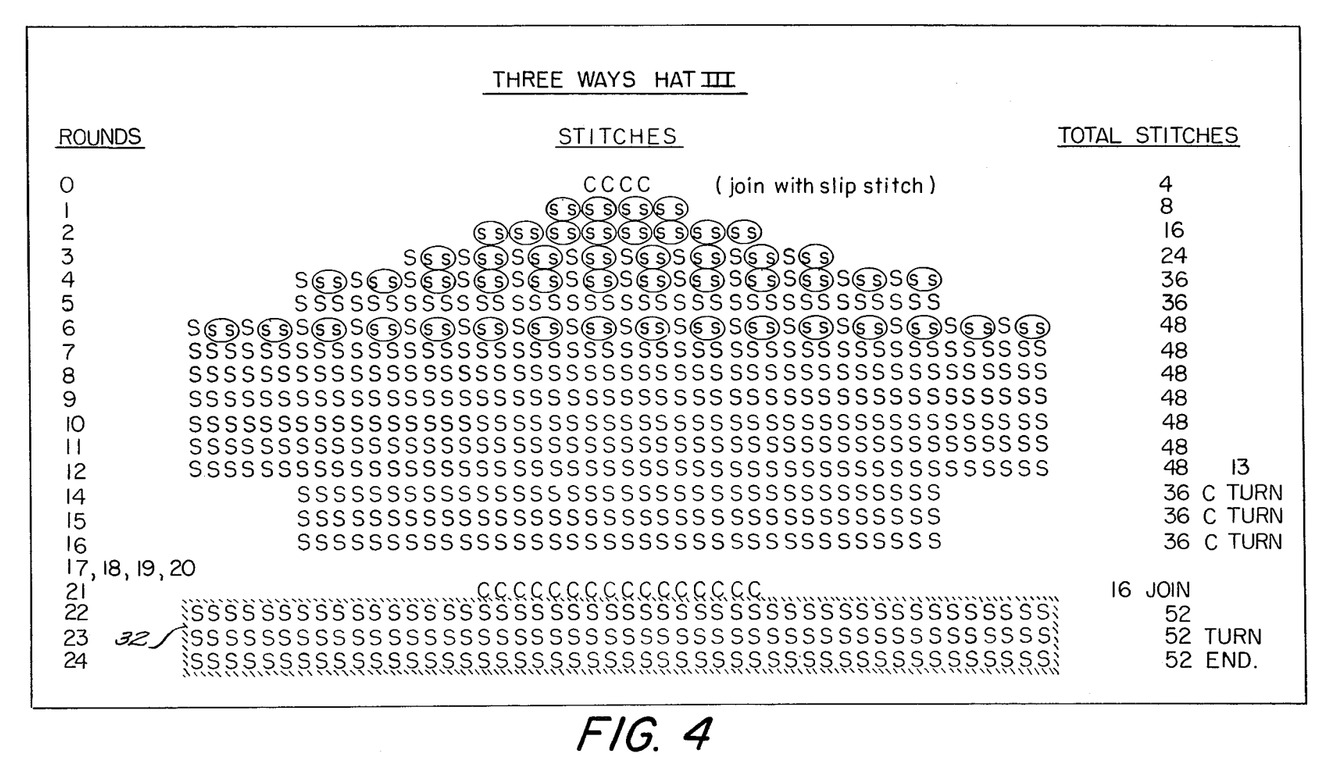

Referring now to the drawings in detail, and initially to FIG. 1 thereof, a selection of small hats which are adapted to be crocheted following the method of instruction of the present invention, are illustrated. As mentioned, the method of the invention contemplates the illustration of each stitch and step to be followed in crocheting or knitting a particular product. The instructions for doing so for the hats of FIGS. 1a-1c are depicted in FIGS. 2-4.

The method of the invention further contemplates the use of predetermined coded symbols representing specific instructions, to be used on the pattern-like illustrations of the invention. The particular key or code used for each individual instruction may be selected as desired and is not critical to the invention. However, it is preferable that the key or code selected for each instruction have some relation to the actual instruction itself. For illustrative purposes, set forth here below is a table of a "Key to Symbols" used in the instructions of the invention. In this table, separate codes are provided for knitting and crocheting, and in some instances the same symbol is used, having a different meaning depending on whether knitting or crocheting is being performed. The specific instruction associated with each code letter or key is an instruction which would be understood by those skilled in the art. That is, instruction such as "cast on", "chain", "single" and "double crochet" are all terms understood by those knowledgeable in the knitting and crocheting arts, and thus they are not described in detail in this application.

| TABLE OF KEY TO SYMBOLS | | | |
|---|---|---|---|
| Arbitrary symbols which are convenient to employ and which are used in the drawing include: | | | |
| KNIT | | CROCHET | |
| C | cast on | C | chain |
| K | knit | S | single crochet |
| P | purl | D | double crochet |
| Y | yarn over | H | half double crochet |
| B | bind off | T | triple crochet |
| S | slip stitch | S | slip stitch |
| P̄ | popcorn | P̄ | popcorn |
| K̄ | decrease knit | S̄ | decrease single crochet |
| P̄ | decrease purl | D̄ | decrease double crochet |
| — | applies to all stitches | — | applies to all stitches |
| KK | increase one knit stitch | SS | increase one single stitch |
| PP | increase one purl stitch | DD | increase one double crochet |
| The number of characters following the initial character is the number of stitches increased (applies to all stitches). | | | |
| KKK | gather several stitches working from bottom to top | SSS | gather several stitches working from bottom to top |
| P/U | pick up stitches | P/U | pick up stitches |
| ** | at beginning of line to note changes such as changing needles, picking up part of a stitch, yarn, etc. | | |
| → | direction of work | → | direction of work |

Figure 2:
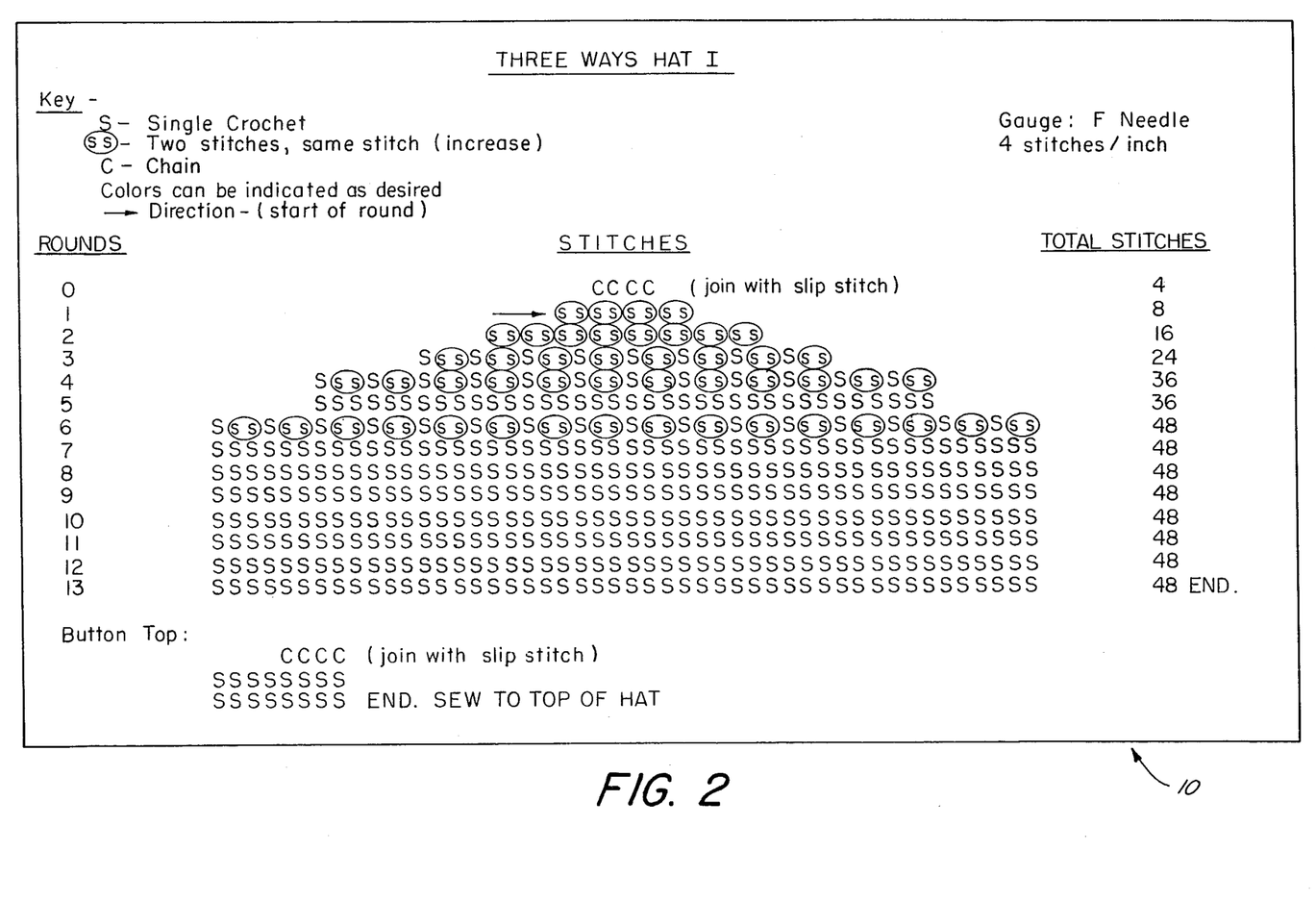
FIGS. 2-4 respectively represent the instructions according to the method of the present invention utilized to form the hats of FIGS. 1a-c.

Referring to FIG. 2 of the drawing, the instructions of the invention are provided for the hat of FIG. 1a on a printed sheet, in which each stitch to be formed is illustrated. The instruction sheet or pattern 10 may have a key code, in the upper left hand corner illustrating the key (from the master table set forth above) for the various stitches and instructions to be used on that particular instruction sheet. In addition, in the upper right hand corner the instruction sheet will tell the operator the size needle and the "gauge" for the stitches to be formed in creating this particular item.

The specific instructions include a column of row numbers at the left or right with each number representing a sequential row of stitches to be formed. The central portion of the instructions under the term "STITCHES" depicts each individual stitch, according to the key, which is to be formed by the operator. Finally, the right or left side "TOTAL STITCHES" column tells the operator the precise number of stitches to be formed in each of the rows. By this arrangement, it is seen that a clear depiction of the product to be formed is provided in the actual shape of the product. Although it is not necessary, it may be desirable to form the instructions in a size substantially equal to that of the finished product.

As is apparent, the instructions of FIG. 2 specify needle type, type of yarn, as well as stitches per inch both horizontally and vertically. Using similar weight yarn and the suggested needle size, a sample swatch is first worked, typically casting-on approximately 20 stitches and working, e.g., in stocking knit stitch, for approximately 3 inches before binding off the finished sample.

As is known to one skilled in the art, if that resultant sample does not have the specified dimensions, appropriate adjustments must be made by either changing the needle size or the number of stitches stitched. Conversions necessitated by individual variances in stitching gauge can be indicated directly on the pattern 10 thereby obviating the need for complicated calculations.

Depending upon the nature of the piece being worked, the present method affords an aerial view of the actual piece, with a line by line, stitch by stitch indication of each and every stitch to be worked. Beginning with row 0 in FIG. 2, the directions indicate that four stitches are to be chained and that these stitches are to be joined with a single slip stitch; row 1 indicates that two single crochets are to be stitched into each of the previously worked chain stitches; similarly, row 2 indicates that two single crochets are to be worked into each of the previously crocheted eight single crochets. Row 3 indicates that the row will be increased by eight stitches and that these eight increases are to be evenly dispersed among the previously stitched 16 single crochets of row 2. Similar increases occur for both row 4 and row 5. No increases occur in rows 6 through 12 and the piece is merely worked in single crochet. The arrows indicate the direction in which the work progresses.

The directions as indicated for each of the hats of FIGS. 1a, 1b and 1c are identical through row 13. However, modifications occur in the subsequent rows to yield the various styles including the flared brim of the hat in FIG. 1b (see FIG. 3) and the face mask opening of the hat in FIG. 1c (see FIG. 4).

Figure 5A:
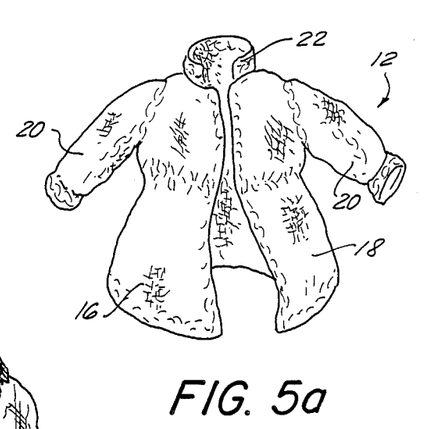
FIG. 5a is front view of a doll's coat adapted to be knit according to the teachings of the present invention.
Figure 5B:
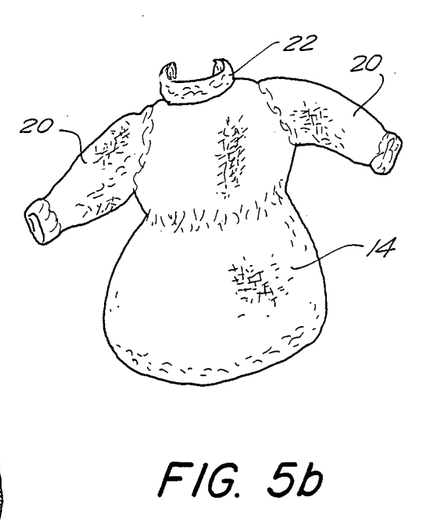

FIGS. 5a and b illustrate a doll's coat 12 adapted to be knit according to the instructions of the method of the present invention. The principle of the instructions are identical to those previously described with respect to the crocheted hat of FIG. 1.

As is known to those skilled in the art, an article of clothing such as the coat depicted in FIG. 5 is formed of a number of components, namely for example a back 14, right and left sides 16, 18, the sleeves 20 and the collar 22. According to the present invention a separate instruction sheet or pattern is provided for each of these elements.

Figure 6:
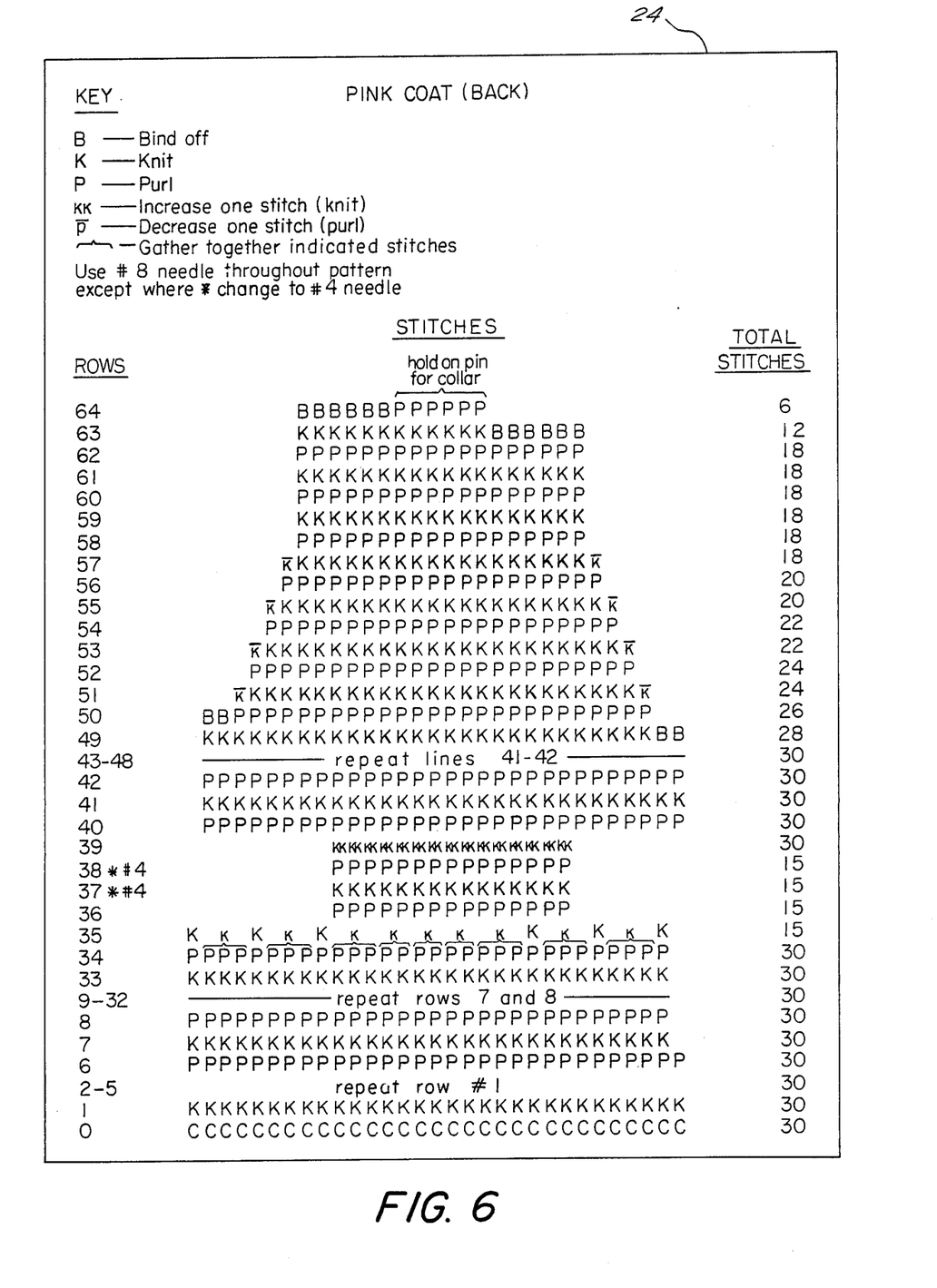
FIG. 6 is an illustration of the instructions according to the present invention for knitting the back of the coat of FIG. 5a and b.

FIG. 6 provides an illustration of the instructions and/or pattern 24 for the back of the coat of FIGS. 5a and 5b. Again, at the top of the instruction sheet for pattern 24 is a key providing the symbols for the various stitches and operations to be performed by the operator. This key either duplicates or supplements a separate main key code, such as set forth in the table above. As described above, since each code element on the instruction represents a particular operation or stitch, the instructions can readily be followed using the key. In this case the piece is worked from the bottom up and, for example, it is seen that in line 0, thirty stitches are cast on, and in line 1, there are thirty knit stitches. This is repeated in lines 2-5, while row 6 constitutes thirty purl stitches. Thereafter, rows of thirty knit and purl stitches are alternated through to row 34. At rows 35-38, a different needle is used, in order to aid in forming the pinched back of the coat. In row 35, fifteen knit stitches are formed with alternate knit stitches being knitted to three purl stitches of the preceeding row 34. As is apparent, the remainder of the coat can be formed by simply following the key code instructions. Again, as in the previously described embodiment, the left column of the instructions provides the number of each row while the right column provides the number of stitches in each of these rows.

Figure 7:
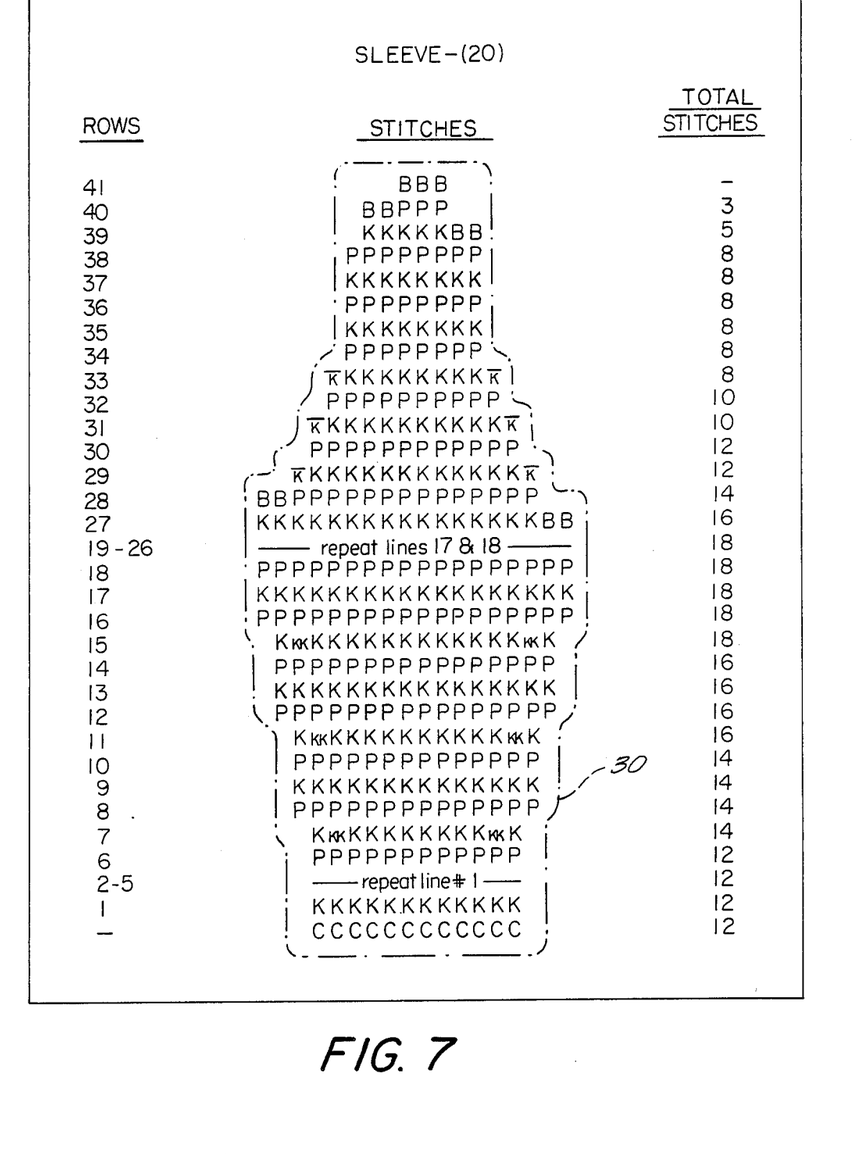
FIG. 7 is an illustration of the instructions for knitting the sleeve of the coat.
Figure 8:
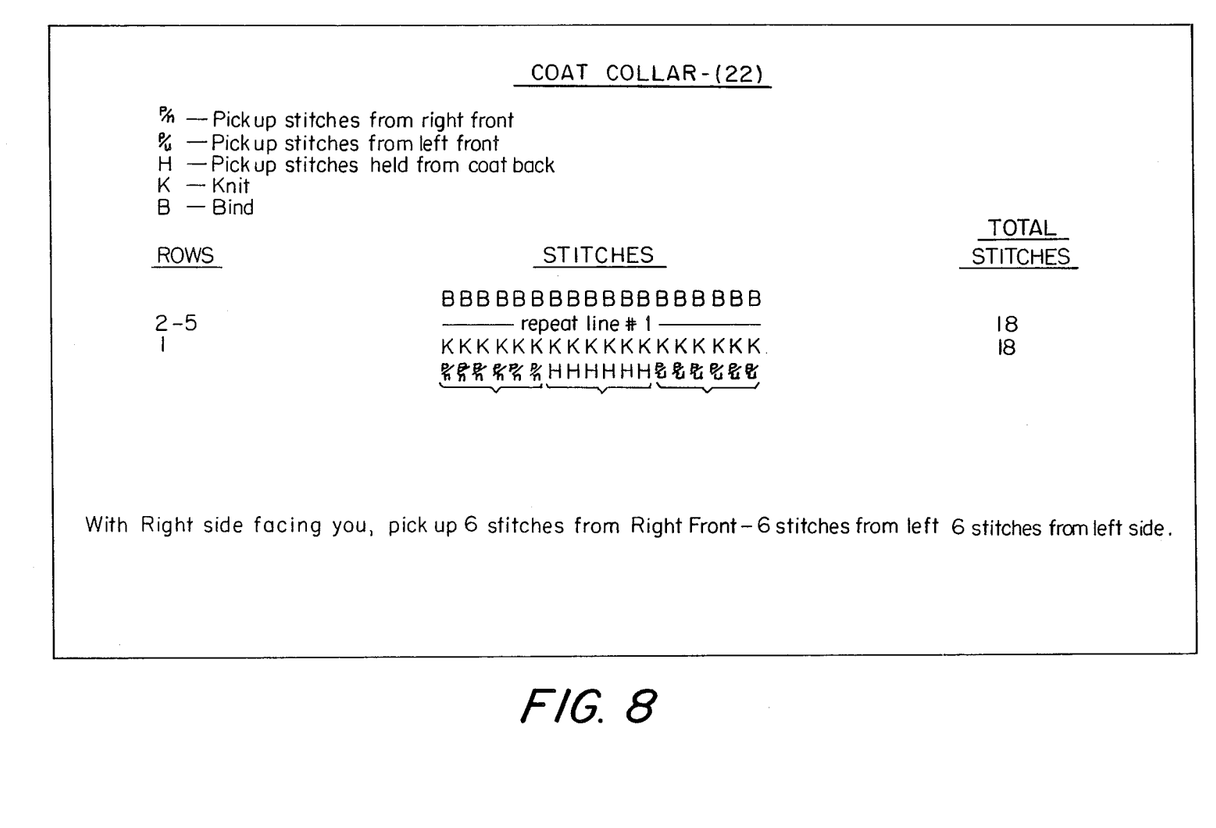
FIG. 8 is an illustration of the instructions for the coat collar.
Figure 9:
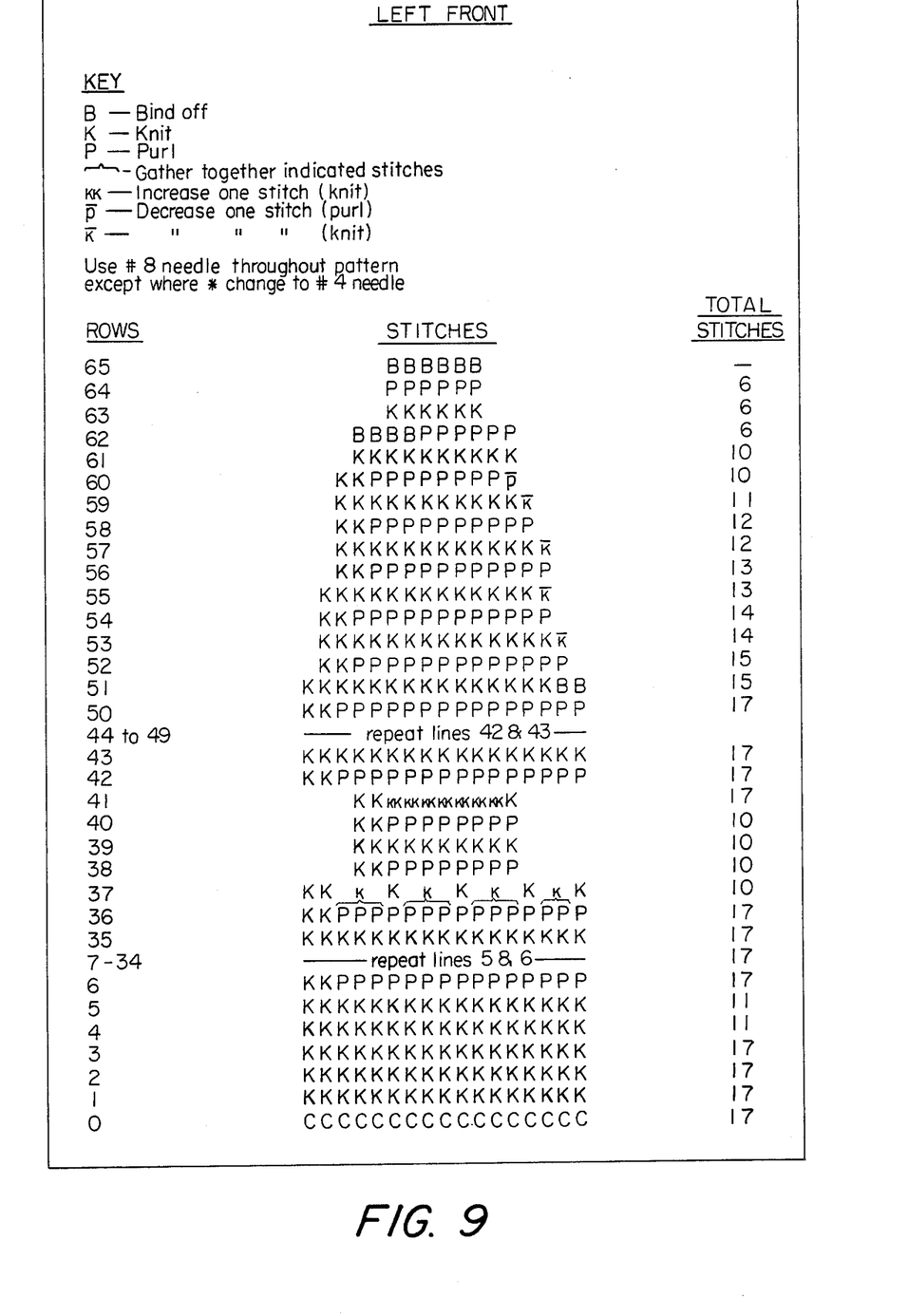
FIGS. 9 and 10 are illustrations of the instructions for the left front and right front of the coat respectively.
Figure 10:
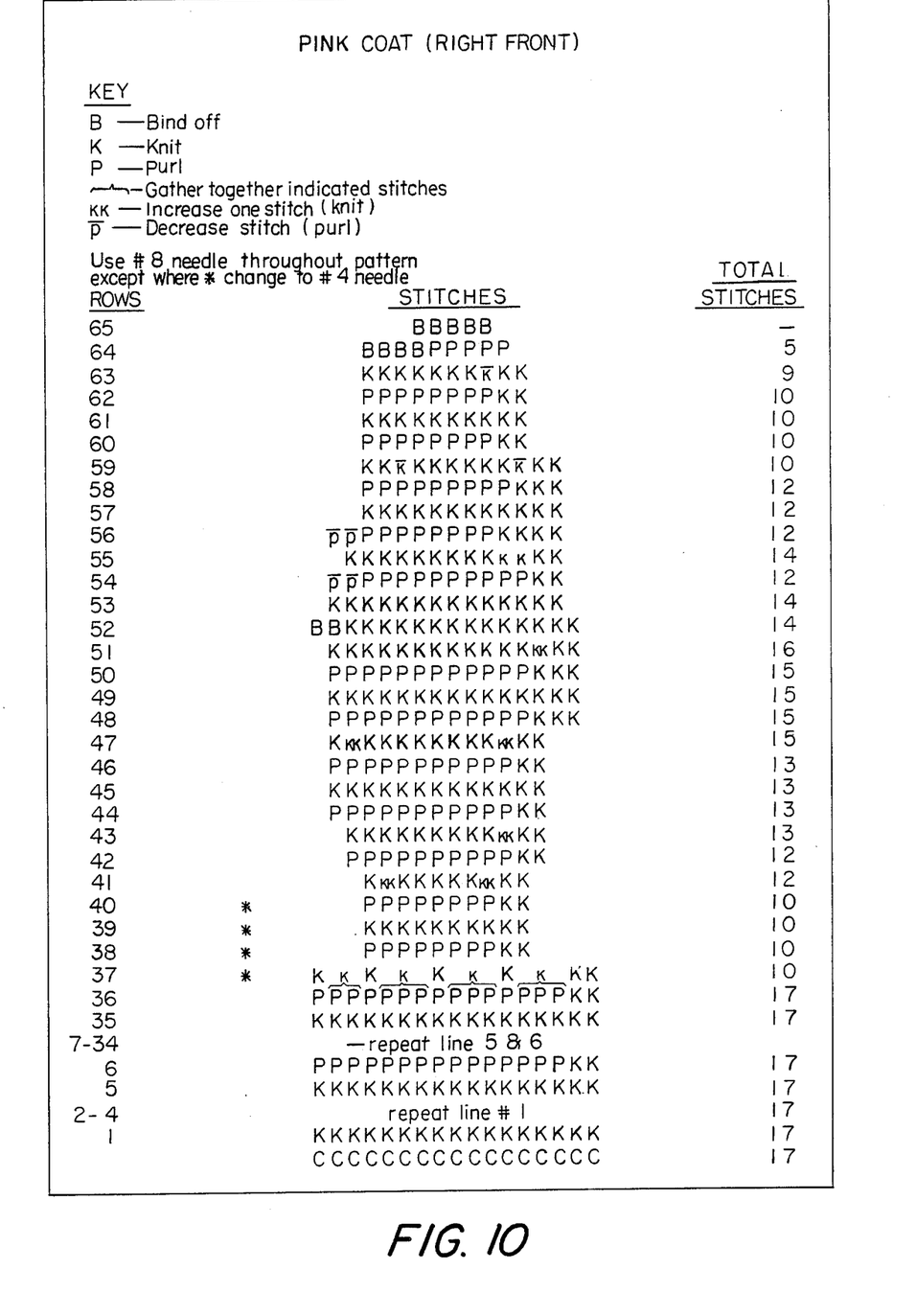

Similar instruction sheets are provided for the sleeve 20, as shown in FIG. 7, the collar 22, as shown in FIG. 8, and the right and left sides 16, 18, as shown in FIGS. 9 and 10 respectively.

The instructions according to the invention may be formed in any desired legible size. In some cases where there are complicated patterns and designs, it may be desirable to form the instructions in the actual size of the finished product, to permit the operator to simply lay the product or piece over the instructions during formation, to determine whether it is being properly formed. To aid in determining whether the outline is correct, a pattern line 30 may be provided about the central coded instruction array, as seen for example in FIG. 7.

It is apparent from the above description that a relatively simple method of instruction for the formation of knitted and crocheted garments is provided which will enable even the absolute novice to follow the instructions along stitch by stitch to produce the desired garment.

Where multiple colors are utilized in the garment, it is desirable to color code the key or code elements, or to provide bands of colors in the areas corresponding to the colors to be used on the finished garment. For example, in the crocheted hat of FIGS. 1c and 4, a lower band 32 of green yarn is used to form a border at the bottom of the hat. To indicate this in the instructions, the letter for the stitches in this area are printed in green, or, if desired, the letters can be printed on a green field 32, as indicated in FIG. 4.

Although illustrative embodiments of the present invention have been described above with reference to the accompanying drawings, it will be understood that the invention is not limited to those precise embodiments, and that various changes and modifications may be effective therein by one skilled in the art without departing from the scope or spirit of this invention.

What is claimed is:

1. A method for use in preparing knitted and crocheted articles constructed of more than one type of stitch comprising the steps of:
   forming a pattern of the article,
   displaying on that pattern the symbols representative of each type of stitch to be formed, and indicating on said pattern the position, number, and character of each stitch.

2. A method of instructing knitting and crocheting operations involving more than one type of stitch comprising the steps of providing a display of an array of coded characters representing the varying operations to be performed by the operator, said display including a coded character for every stitch to be formed arranged in rows corresponding to the rows of stitches in the finished product, said characters representing the different types of stitches to be used in forming the product.

3. The method as defined in claim 2 including the step of color coding said coded characters to represent the color of yarn to be used.

4. The method as defined in claim 3 including the step of providing a first legend adjacent each row of characters in the array representing the row number.

5. The method as defined in claim 4 including the step of providing a second legend adjacent each row of characters in the array representing the number of stitches in the array.

6. A knitting and crocheting guide comprising an instruction sheet having an array of coded characters thereon representing the varying operations to be performed by the operator, said operations involving more than one type of stitch, and said array including a coded character for every stitch to be formed in the finished product arranged in rows corresponding to the rows of stitches in the finished product.

7. The guide as defined in claim 6 wherein said characters represent the different types of stitches to be used in forming the product.

8. The guide as defined in claim 7 wherein said coded characters are color coded to represent the color of yarn to be used.

9. The guide as defined in claim 8 wherein the overall dimensions of the array of coded characters are selected to correspond to the overall dimensions of the finished product thereby to enable the dimensions of the finished product to be checked against the array.

10. The guide as defined in claim 9 including a row number adjacent to each row of said coded characters.

11. The guide as defined in claim 10 including a number adjacent each row of coded characters representing the number of stitches in that row.

* * * * *